United States Patent [19]
Urade et al.

[11] Patent Number: 5,483,289
[45] Date of Patent: Jan. 9, 1996

[54] DATA SLICING CIRCUIT AND METHOD

[75] Inventors: Masakazu Urade; Hisao Kobayashi, both of Schaumburg, Ill.; Yukihiro Yagi, Kyoto, Japan; Katsuhiko Hashimoto, Nagaokakyo, Japan; Sachiko Nishii, Kyoto, Japan

[73] Assignee: Matsushita Electric Industrial Co., Ltd., Osaka, Japan

[21] Appl. No.: 171,744

[22] Filed: Dec. 22, 1993

[51] Int. Cl.⁶ .................................................. H04N 7/08
[52] U.S. Cl. ........................ 348/468; 348/465; 348/473; 375/317
[58] Field of Search .................................. 348/476, 477, 348/478, 479, 465, 467, 468; 375/316, 317; H04N 7/08, 7/087, 7/083, 7/084, 7/085, 7/088, 11/00, 7/04

[56] References Cited

U.S. PATENT DOCUMENTS

| | | | |
|---|---|---|---|
| 4,461,002 | 7/1984 | Nanko | 348/478 |
| 4,667,235 | 5/1987 | Nozoe et al. | 348/478 |
| 4,688,088 | 8/1987 | Hamazaki et al. | 348/94 |
| 4,794,626 | 12/1988 | Tanable et al. | 348/500 |
| 5,249,050 | 9/1993 | Zato | 348/478 |
| 5,301,023 | 4/1994 | Zato | 348/476 |

Primary Examiner—James J. Groody
Assistant Examiner—Michael H. Lee
Attorney, Agent, or Firm—Willian Brinks Hofer Gilson & Lione

[57] ABSTRACT

A circuit and method of data slicing a television signal comprises: an extractor 2 for extracting a specific component from the television signal of analog form; a slicer 3 for slicing the specific component of the television signal produced by the extractor 2 and converting it to its digital form; a decoder 4 for decoding an output of the slicer 3 for display; an initial value storage 10 for storing an initial value of the slice level; slice level controllers 7 and 8 for varying the initial slice level at a predetermined rate; a signal detector 11 for examining whether or not the digitized specific component from the slicer 3 is a desired multiplex signal; a temporary slice level memory 13 for storing the upper and lower levels of the desired multiplex signal detected by the signal detector 11; a calculator 9 for calculating an optimum value of the slice level from the upper and lower levels of the multiplex signal stored in the temporary slice level memory 13; a slice level storage 6 for storing the optimum slice level calculated by the calculator 9; and a controller 14 for selectively feeding the slicer 3 with the optimum slice level retrieved from either the slice level storage 6 or the slice level controllers 7 and 8 according to a resultant judgment of the signal detector 11.

27 Claims, 7 Drawing Sheets

DATA SLICING CIRCUIT AND METHOD

BACKGROUND OF THE INVENTION

The present invention relates in general to the reception and decoding of television signals containing closed caption information. More particularly, it relates to an improved circuit and method for data slicing an analog closed caption signal to produce an optimum form of the digital closed-caption information contained therein.

In North America, a television (TV) receiver having a 13-inch or larger screen is typically equipped with circuitry for superimposing text captions of speech on the television picture. This is known as a caption system and allows hearing impaired viewers to read the audio portion of a television program. The United States has proposed regulations that would require the provision of a caption decoder in all 13 inch or larger TV receivers sold in the U.S., even if the unit is not actually manufactured in the U.S.

Most caption decoders currently available in the U.S. are discrete teletext receivers or adaptors that must be connected to the TV receiver. A caption decoder installed in a TV receiver is often referred to as a closed-caption decoder, and caption data or signals multiplexed with television signals are often referred to as closed caption (CC). In order to remain competitive, manufacturers and/or retailers rarely charge extra for TV receivers with on-board closed-caption decoders. Accordingly, there is always a need for a closed caption decoder that is effective, simple, and inexpensive to manufacture.

According to current standards, composite TV signals include a vertical sync signal, a horizontal sync signal, and a closed caption signal. FIGS. 7a to 7d illustrate examples of a composite TV signal (with closed caption), a vertical sync signal, a horizontal sync signal, and a closed caption signal, respectively. The closed-caption signal is typically inserted in the twenty-first period of the horizontal sync signal (FIG. 7c) as measured from the decay edge (e) of the vertical sync signal (FIG. 7b). Such a closed-caption signal is often referred to as Field 1, while a closed caption signal in the 284th horizontal sync period (not shown) is often referred to as Field 2.

The closed-caption signal shown in FIG. 7d includes a 3.58 MHz burst signal ($\approx$10.5 µs from the decay of the horizontal sync signal to the end of the burst), a 7-cycle clock run-in signal ($\approx$12.91 µs from the end of the burst signal, the frequency being 32×fH where fH is 15.75 KHz of the horizontal sync signal frequency), a start bit signal ($\approx$6.958 µs from the end of the clock run-in signal) indicating the start of caption data, and a data character signal ($\approx$31.778 µs from the end of the start bit signal) containing 2 bytes of caption data.

Each of the 2 bytes of closed caption data has its uppermost (or leftmost) bit assigned as a parity bit. The parity bit is used for the detection of data error. In an odd-parity system, a bit is added to the transmitted bits (0s and 1s) so that there are an odd number of 1s, and the data bits are judged to be correct if there are an odd number of 1s. If the number of 1s is even, the data bits are judged to be abnormal and are not accepted.

When analog signals are converted to digital signals, a threshold level is often used to determine whether the input analog signal will be interpreted as a logical 0 or a logical 1. In general, if the input analog signal exceeds the desired threshold level, the input analog signal is converted to a logical 1. Conversely, if the input analog signal is less than the desired threshold level, the input analog signal is converted to a logical 0. This technique of setting a threshold level for converting analog to digital is known as "data slicing."

A data slicer generally acts like a comparator. One input to the data slicer is the analog signal that is to be converted to digital. The second input to the comparator is the threshold level, also known as the "slice level." The output of the data slicer is the converted digital signal. The data slicer, in the same manner as a conventional comparator, continuously compares the analog input signal to the threshold level. When the input analog signal exceeds the desired threshold level, the data slicer outputs a constant voltage level representing a logical 1. When the input analog signal is less than the desired threshold level, the data slicer outputs no voltage, thus representing a logical 0.

A key aspect of data slicing is to set the proper slice level. A slice level that is too low will react to noise and other disturbances that are not valid data. A slice level that is too high may misinterpret actual data as no signal.

In a known method of data slicing a closed-caption signal, the slice level is automatically adjusted based on the duty cycle of the clock-run-in signal. First, a composite TV signal (of analog form) is fed to a caption signal detecting means where the closed-caption signal is extracted from the composite TV signal. The closed-caption signal is then processed by a clock run-in signal extracting means for picking up a clock run-in signal. The clock run-in signal is examined by a duty detecting means to measure a duty factor. The clock run-in signal is typically a sine wave having seven cycles, and, when it is sliced at the center of the peak to peak sine wave voltage, the duty factor can be as good as 1:1. If the slice level is higher, the duty factor may shift to 0.9:1.1, for example. If the slice level is lower, the duty factor may shift to 1.1:0.9, for example. A slice level varying means is provided for raising or lowering the slice level to the center of the peak to peak clock-run-in signal (a sine wave) so that the duty factor shifts back to 1:1, and accordingly the closed-caption signal is sliced at its optimum slice level. A data sliced form of the closed-caption signal is then decoded by a decoding means for display as a caption on a TV receiver.

The known data slicing method described above is still responsive to unwanted interference components (i.e., noise) mixed in with the closed caption signal, thereby decreasing the quality of the TV signal. Additionally, in areas where the received TV signals may be low, the slice level tends to vary abruptly, thus causing a fault action from the closed caption decoder.

Accordingly, none of the prior art devices provides a data slicer and method having the advantage of being effective, simple, and inexpensive to manufacture and implement over a wide range of operating conditions. Further, none of the prior art devices provides a data slicer and method having the advantage of being substantially unresponsive to noise in the closed caption signal, and having the additional advantage of being capable of receiving and decoding low level TV signals.

The disclosed circuit and method has the advantage of using the start bit and the parity bit to detect the presence of the closed caption signal, and thus avoids the problems associated with using, for example, the clock-run-in signal to detect the presence of the closed caption signal. The disclosed circuit and method also uses a method of calculating a desired slice level based on the minimum and maximum allowed slice level, and thus avoids the problems associated with using, for example, the duty cycle of the sine wave clock-run-in signal. The conventional method of adjusting the slice level based on the duty factor of the clock-run-in signal is substantially responsive to any unwanted interference component (namely, noise) mixed in the closed-caption signal, thus declining the quality of a TV signal. By calculating the slice level based on the minimum and maximum allowed slice levels, the circuit and method of the present invention is better able to detect low TV signals which previously tended to generate faults in the closed caption decoder when the low level closed caption signal changed abruptly.

SUMMARY OF THE INVENTION

Accordingly, it is an object of the present invention to provide a data slicer circuit and method that is effective, simple, and inexpensive to implement.

It is another object of the present invention to provide a circuit and method of obtaining an optimum slice level of a data slicer.

It is another object of the present invention to provide a data slicer and method that is substantially unresponsive to noise in the closed caption signal.

It is yet another object of the present invention to provide a circuit and method of data slicing capable of operating successfully in a low TV signal receiving area.

These and other objects and advantages are achieved with the present invention by providing a circuit for generating a desired slice level voltage, which includes: a slice level output device capable of outputting a slice level output; and a calculator coupled to said slice level output device for calculating the desired slice level and providing said desired slice level to said slice level output device; said calculator receiving a minimum slice level and a maximum slice level and calculating said desired slice level as being between said minimum slice level and said maximum slice level.

In one aspect of the present invention, the calculator in the above-described circuit calculates said slice level by reducing said maximum slice level by one-third of the difference between the maximum slice level and the minimum slice level. In another aspect of the invention, the calculator calculates the slice level by reducing said maximum slice level by one-fourth of the difference between the maximum slice level and the minimum slice level. In an even further aspect of the invention, the calculator calculates said slice level by reducing said maximum slice level by one-half of the difference between the maximum slice level and the minimum slice level.

The above-described circuit may further include a controller coupled to said slice level output device and said calculator, the controller being capable of instructing said calculator to calculate said desired slice level based on said maximum and said minimum slice levels and provide said desired slice level to said slice level output device, the controller being further capable of instructing said slice level output device to output said desired slice level as said slice level output.

A particular embodiment of the present invention is an apparatus for data slicing which includes: a slicer for receiving and slicing an initial analog signal, thereby converting said initial analog signal to digital form; a decoder for decoding an output of the slicer for display on a TV receiver; an initial value storage for storing an initial value of the slice level; a slice level controller for varying the initial slice level by a predetermined amount; a signal detector for examining whether or not the digitized specific component from the slicer is a desired multiplex signal; a temporary slice level memory for storing the upper and lower levels of the desired multiplex signal detected by the signal detector; a calculator for calculating an optimum value of the slice level from the upper and lower levels of the multiplex signal stored in the temporary slice level memory; a slice level storage for storing the optimum slice level calculated by the calculator; and a controller for selectively feeding the slicer with the optimum slice level retrieved from either the slice level storage or the slice level controller according to a resultant judgment of the signal detector.

Another particular embodiment of the present invention is a data slicing circuit that includes: a data slicer for receiving and slicing a component of a television signal and converting said component to digital; a decoder for receiving and decoding an output of said data slicer; an initial value storage for storing an initial slice value; a slice level controller for varying said initial slice level by a predetermined amount; a signal detector for detecting whether or not said digitized component from said slicer is a valid signal; a temporary slice level memory for storing upper and lower levels of said valid signal detected by the signal detector; a calculator for calculating an optimum value of a slice level from the upper and lower levels of the valid signal stored in the temporary slice level memory; a slice level storage for storing the optimum slice level calculated by the calculator; and a controller for instructing said calculator to feed said optimum slice level to said data slicer.

The present invention also provides a method of generating a desired slice level voltage, the steps of which include: providing a slice level output device capable of outputting a slice level output; calculating said desired slice level as being between a minimum slice level and a maximum slice level; and providing said desired slice level to said slice level output device.

A particular embodiment of the method of data slicing according to the present invention includes the steps of: (a) initializing a slice level; (b) slicing at the slice level and digitizing a specific component of the television signal; (c) examining through identifying start bits and performing parity check whether or not the digitized component is a desired multiplex signal (i.e., a valid signal); (d-1) increasing the slice level by a predetermined amount when it is determined at (c) that the multiplex signal is not present before returning to (b); (d-2) temporarily storing the slice level as a lower limit of the multiplexed signal when it is determined at (c) that the multiplex signal is present; (e) increasing the slice level by a predetermined amount; (f) slicing at the increased slice level and digitizing the specific component of the television signal; (g) examining through identifying start bits and performing parity check whether or not the digitized component is a desired multiplex signal; (h-1) increasing the slice level by the predetermined amount when it is determined at (g) that the multiplex signal is present before returning to (f); (h-2) temporarily storing the slice level as an upper limit of the multiplexed signal when it is determined at (g) that the multiplex signal is not present; (i) calculating an optimum slice level from the upper and lower limits stored at (d-2) and (h-2); and (j) slicing at the optimum slice level and digitizing a succeeding component multiplexed with the television signal prior to decoding.

Another particular embodiment of the method of data slicing according to the present invention includes the steps of: (a) initializing a slice level having a value; (b) slicing at the slice level and digitizing a specific component of the television signal; (c) examining through identifying start bits and performing parity check whether or not the digitized component is a desired multiplex signal; (d-1) if it was determined at step (c) that the digitized component is not the desired multiplex signal, increase the value of the slice level by a predetermined amount and return to step (b); (d-2) temporarily storing the slice level as a lower limit of the multiplexed signal if it was determined at (c) that the multiplex signal is present; (e) increasing again value of the slice level by the predetermined amount; (f) slicing at the slice level and digitizing the specific component of the television signal; (g) examining through identifying start bits and performing parity check whether or not the digitized component determined in step (f) is a desired multiplex signal; (h-1) if it was determined at step (g) that the digitized component is the desired multiplex signal, increase the value of the slice level by the predetermined amount and return to step (f); (h-2) temporarily storing the slice level as an upper limit of the multiplexed signal if it was determined at (g) that the multiplex signal is not present; (i) calculating an optimum slice level from the upper and lower limits stored at (d-2) and (h-2); and (j) slicing at the optimum slice level and digitizing a succeeding component multiplexed with the television signal prior to decoding.

Another particular embodiment of the method of data slicing according to the present invention includes the steps of: (a) initializing a slice level having a value; (b) slicing at the slice level and digitizing a specific component of the television signal; (c) examining through identifying start bits and performing parity check whether or not the digitized component is a closed-caption signal; (d-1) if it was determined at step (c) that the closed-caption signal is not present, increase the value of the slice level by a first predetermined amount and return to step (b); (d-2) initializing the slice level again if it was determined at (c) that the closed-caption signal is present; (e) slicing again at the slice level and digitizing the specific component of the television signal; (f) examining through identifying start bits and performing parity check whether or not the digitized component determined at step (e) is a closed-caption signal; (g-1) if it was determined at step (f) that the closed-caption signal is not present, increase the value of the slice level by a second predetermined amount smaller than the first predetermined amount and return to step (e); (g-2) temporarily storing the slice level as a lower limit of the closed-caption signal if it was determined at (f) that the closed-caption signal is present; (h) increasing again the value of the slice level by the second predetermined amount; (i) slicing again at the slice level and digitizing the specific component of the television signal; (j) examining again through identifying start bits and performing parity check whether or not the digitized component of step (i) is a closed-caption signal; (k-1) if it was determined at step (j) that the closed-caption signal is present, increase again the value of the slice level by the second predetermined amount and return to step (i); (k-2) temporarily storing the slice level as an upper limit of the closed-caption signal if it was determined at (j) that the closed-caption signal is not present; (l) calculating an optimum slice level from the upper and lower limits stored at (g-2) and (k-2); and (m) slicing at the optimum slice level and digitizing a succeeding component multiplexed with the television signal prior to decoding.

Another particular embodiment of the method of data slicing according to the present invention includes the steps of: (a) initializing a slice level having a value; (b) slicing at the slice level and digitizing a specific component of the television signal; (c) examining through identifying start bits and performing parity check whether or not the digitized component is a closed-caption signal; (d) slicing at the same slice level as set forth in step (b) and again digitizing the specific component of the television signal; (e) examining again through identifying start bits and performing parity check whether or not the digitized component is a closed-caption signal; (f-1) if it was determined either steps (c) or (e) that the closed-caption signal is not present, increase the value of the slice level by a first predetermined amount and return to step (b); (f-1') returning to step (b) if it was not determined at both steps (c) and (e) that the closed-caption signal is present; (f-2) initializing the slice level again if it was determined at both (c) and (e) that the closed-caption signal is present; (g) slicing again at the slice level and digitizing the specific component of the television signal; (h) examining again through identifying start bits and performing parity check whether or not the digitized component is a closed-caption signal; (i) slicing at the same slice level set forth in step (g) and digitizing the specific component of the television signal; (j) examining through identifying start bits and performing parity check whether or not the digitized component determined at step (i) is a closed-caption signal; (k-1) if it was determined at either (h) or (j) that the closed-caption signal is not present, increase the value of the slice level by a second predetermined amount smaller than the first predetermined amount and return to step (g); (k-2) temporarily storing the slice level as a lower limit of the closed-caption signal if it was determined at both (h) and (j) that the closed-caption signal is present; (l) increasing the value of the slice level by the second predetermined amount; (m) slicing again at the slice level and digitizing the specific component of the television signal; (n) examining again through identifying start bits and performing parity check whether or not the digitized component is a closed-caption signal; (o-1) if it was determined at step (n) that the closed-caption signal is present, increase the value of the slice level by the second predetermined amount and return to step (m); (o-2) temporarily storing the slice level as an upper limit of the closed-caption signal if it was determined at (n) that the closed-caption signal is not present; (p) calculating an optimum slice level from the upper and lower limits stored at (k-2) and (o-2); and (q) slicing at the optimum slice level and digitizing a succeeding component multiplexed with the television signal prior to decoding.

Another particular embodiment of the method of data slicing according to the present invention includes the steps of: (a) initializing a slice level having a value; (b) slicing at the slice level and digitizing a specific component of the television signal; (c) examining through identifying start bits and performing parity check whether or not the digitized component is a closed-caption signal; (d) slicing at a different slice level from that of (b) and digitizing the specific component of the television signal; (e) examining again through identifying start bits and performing parity check whether or not the digitized component is a closed-caption signal; (f-1) if it was determined at either (c) or (e) that the closed-caption signal is not present, increase the value of the slice level by a first predetermined amount and return to step (b); (f-2) initializing the slice level again if it was determined at both (c) and (e) that the closed-caption signal is present;

(g) slicing again at the slice level and digitizing the specific component of the television signal; (h) examining again through identifying start bits and performing parity check whether or not the digitized component is a closed-caption signal; (i) slicing at a different slice level from that of (g) and digitizing the specific component of the television signal; (j) examining again through identifying start bits and performing parity check whether or not the digitized component of (i) is a closed-caption signal; (k-1) if it was determined at either (h) or (j) that the closed-caption signal is not present, increase the value of the slice level by a second predetermined amount smaller than the first predetermined amount and return to step (g); (k-2) temporarily storing the slice level as a lower limit of the closed-caption signal if it was determined at both (h) and (j) that the closed-caption signal is present; (l) increasing the value of the slice level by the second predetermined amount; (m) slicing again at the slice level and digitizing the specific component of the television signal; (n) examining again through identifying start bits and performing parity check whether or not the digitized component is a closed-caption signal; (o-1) if it was determined at (n) that the closed-caption signal is present, increase the value of the slice level by the second predetermined amount and return to step (m); (o-2) temporarily storing the slice level as an upper limit of the closed-caption signal if it was determined at (n) that the closed-caption signal is not present; (p) calculating an optimum slice level from the upper and lower limits stored at (k-2) and (o-2); and (q) slicing at the optimum slice level and digitizing a succeeding component multiplexed with the television signal prior to decoding.

Thus, it can be seen from the above detailed description that the present invention achieves several advantages. In particular, the circuit and method of the present invention provides a circuit and method of obtaining an optimum slice level of a data slicer that is effective, simple, and inexpensive to implement. Additionally, the present invention provides a circuit and method of data slicing that is capable of operating successfully in a low TV signal receiving area.

DESCRIPTION OF THE PREFERRED EMBODIMENTS

Figure 1:
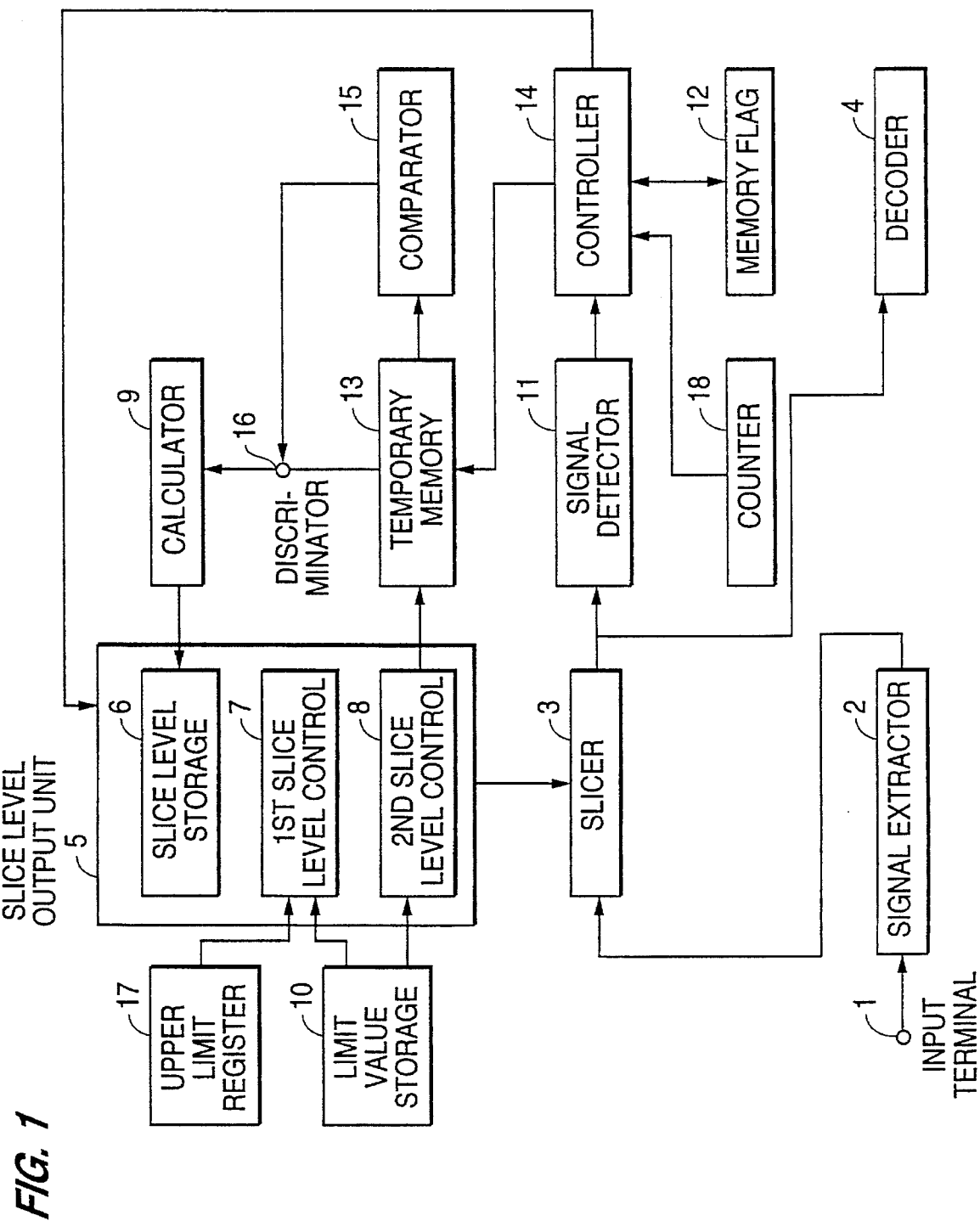
FIG. 1 is a block diagram of a data slicing apparatus showing a first embodiment of the present invention.
Figure 2:
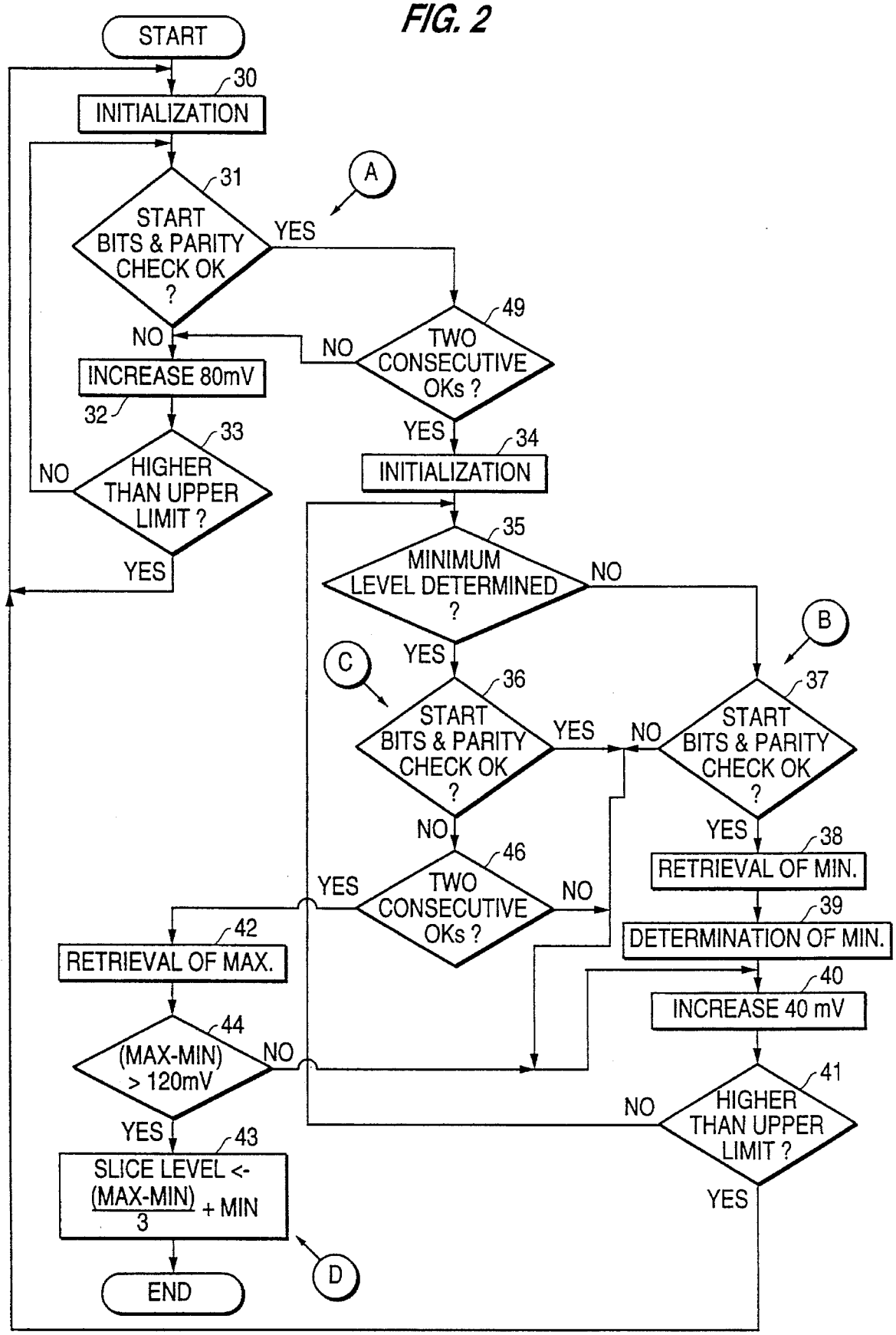
FIG. 2 is a flow chart of a first program embodying a data slicing method associated with the first embodiment of the present invention.

In general, the present invention provides a method of automatically setting a desired slice level of a data slicer. FIG. 2 is a flow diagram illustrating one embodiment of a program for implementing the method of the present invention, and FIG. 1 is one embodiment of a block diagram of the hardware components that may be utilized to implement the method shown in FIG. 2. The slice level is determined in the present invention by a novel method of examining the start bit and parity bit of the closed caption signal, and then calculating the desired slice level based on the minimum and maximum allowed slice levels. Referring in particular to FIG. 2, the disclosed embodiment of the inventive method may be divided into first, second, third and fourth routines, A, B, C and D. The first routine, A, includes blocks 31, 32, 33, and 49. The second routine, B, includes blocks 35, 37, 38, 39, and 41. The third routine, C, includes block 35, 36, 40, 41, 46 and 42. The fourth routine, D, includes block 43.

First Routine A

The first routine A performs a rough analysis on the closed caption signal to determine whether it is present. The closed caption signal is recognized by detecting the presence of both the start bit and the parity bit. If the start bit and parity bit are not detected, then the closed caption signal is not present. If the start bit and parity bit are detected, then the closed caption signal is present. The slice level is initially set to a level that is sufficiently low to ensure that the start bit and parity bit are not detected. Then the slice level is continuously incremented by 80 mV until the start bit and parity bit are detected (thus indicating that the closed caption signal is present). The program then moves to its second routine.

Second Routine B

The second routine B resets the slice level to a level that is sufficiently low to ensure that the start bit and parity bit are not detected. Then the slice level is continuously incremented by only 40 mV until the start bit and parity bit are detected (thus indicating that the closed caption signal is present). As soon as the slice level is detected, it is stored in a temporary memory as the minimum slice level, and the program moves to its third routine.

Third Routine C

The third routine C knows that the slice level (as determined by the minimum slice level found in the second routine B) is now high enough to ensure that the start bit and parity bit are detected. The slice level is again continuously incremented by only 40 mV until the start bit and parity bit are no longer detected (thus indicating that the closed caption signal is not present). This slice level is then stored in a temporary memory as the maximum slice level, and the program is moves to its fourth routine D.

Fourth Routine D

The fourth routine D calculates the optimum slice level based on the stored minimum slice level and the stored maximum slice level according to the following equation:

$$\{(\text{maximum}-\text{minimum})-40(mV)\}/3+\text{minimum}\}$$

Referring again to FIGS. 1 and 2, a more detailed description of one of the preferred embodiments of the present invention will now be described. FIG. 1 is a block diagram of a data slicing apparatus, and FIG. 2 is a flow chart of a program for implementing a data slicing method according to the present invention.

As shown in FIG. 1, a composite TV signal is fed to an input terminal 1 of a signal extractor 2, where a desired component, such as a closed-caption signal, is extracted from the composite TV signal. For the disclosed embodiment, it is assumed that the closed-caption signal is carried in the twenty-first or two hundred eighty-fourth period of the horizontal sync signal component of the composite TV signal.

The extracted component of the composite TV signal is an analog signal that is fed to a slicer 3 where it is data sliced at a given slice level. The slice level is determined in a novel manner which will be explained in more detail later. The resultant data sliced signal (in digital form) is then decoded by a decoder 4 for display of its caption data on a TV screen (not shown).

A slice level output device 5 in the data slicing apparatus includes a slice level storage unit 6, a first slice level control unit 7, and a second slice level control unit 8. The digital output of the slicing apparatus is converted to an analog voltage by a D/A converter (not shown). This analog voltage determines the slice level at which the analog component signal is sliced in the slicer 3.

The slice level storage unit 6 stores the output of a calculator 9 which will also be explained in more detail later. The first and second slice level control units, 7 and 8, calculate an optimum slice level from their respective initial values which are retrieved from an initial value storage unit 10. In this embodiment, the initial values of the slice level are low (at small voltages) and increased gradually by predetermined increments to higher levels in the slice level control units, 7 and 8. The preferred increments are about 80 mV in the first slice level control unit 7 and 40 mV in the second slice level control unit 8. This allows the first slice level control unit 7 to examine promptly whether the closed-caption signal is present or not through a relatively rough searching procedure, while the second slice level control unit 8 is allowed to detect the maximum and minimum levels of the closed-caption signal through fine searching action.

Figure 7A:
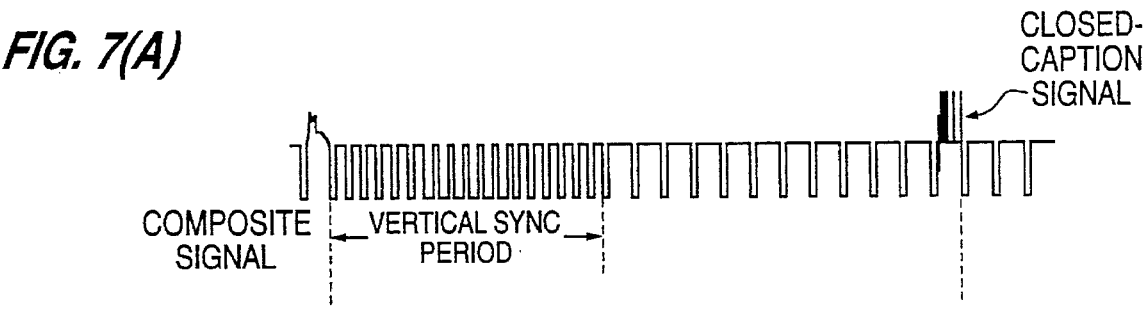
FIGS. 7a to 7d are waveforms of a common television signal.
Figure 7B:
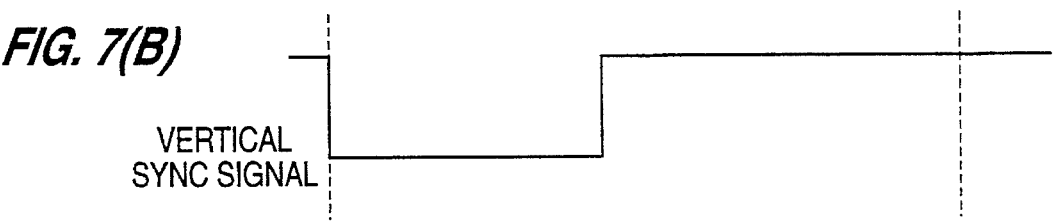
Figure 7C:
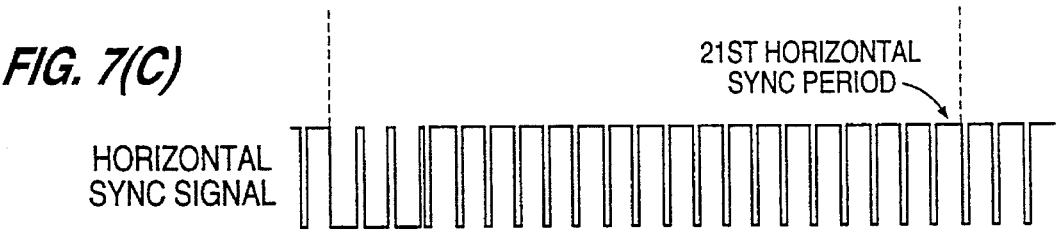
Figure 7D:
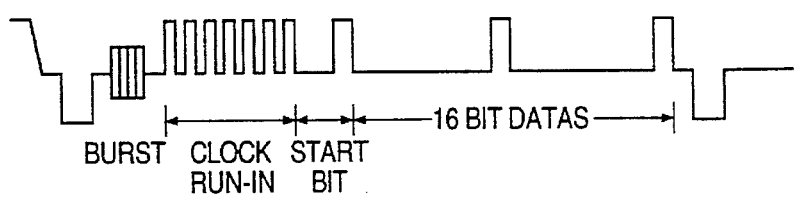

The digital signal converted from its analog form by the slicer 3 is also distributed to a signal detector 11. The signal detector 11 analyzes its digital input regardless of whether it contains a closed-caption signal from the composite TV signal. The signal detector 11 detects both a start bit group 001 (shown in FIG. 7d) and a parity check bit (also shown in FIG. 7d) on the signal data. When the start bit group 001 is present and the total number of bits in the two-byte data is odd, the input digital signal is the closed-caption signal. If the start bits 001 is not present, or if the total number of the bits is even, the input digital signal is judged to not be a closed-caption signal. In this manner, the digital output of the slicer 3 can be examined whether or not it contains a closed-caption signal.

The signal detector 11 is coupled to a controller 14 which activates a memory flag 12 for indicating when the searching methods has detected the minimum slice level for the closed-caption signal. A temporary slice level memory 13 is responsive to the output of the signal detector 11 for temporary storage of minimum and maximum slice levels for the closed-caption signal. More specifically, when the temporary slice level memory 13 receives a signal output of the signal detector 11 indicating that the closed-caption signal is shifted from absent to present, it accepts the slice level output of the second slice level control unit 8 as the minimum level for temporary storage. When the closed-caption signal shifts from being present to absent, the temporary slice level memory stores this slice level as the maximum level for the same purpose.

The slice levels stored in the temporary slice level memory 13 are utilized for the arithmetical operation of a calculator 9 for calculating an optimum slice level. According to the embodiment shown in FIG. 1, the calculator 9 examines a difference between the slice level (minimum) when the closed-caption signal is present and the slice level (maximum) when the closed caption signal is not present. The calculator 9 then determines a level ⅓ from the minimum as the optimum slice level. This optimum slice level is preferred and is adequate to go with any amplitude change in the common TV signal. Of course other multipliers may be used, such as ½ or ¼.

A controller 14 can select and enable either the slice level storage unit 6, the first slice level control unit 7, or the second slice level control unit in the slice level output device 5 for delivery of the slice level to the slicer 3.

A comparator 15 is coupled to the temporary memory 13 and a discriminator 16 for comparing a reference value with the difference between the maximum and minimum slice levels stored in the temporary slice level memory 13. For example, when the difference between the maximum and minimum slice levels is less than the reference value (120 mV in the present example), it is judged that the detection is faulty by the discriminator 16 which thus stops the arithmetical operation of the calculator 9. Thus, a faulty output from the signal detector 11 can be canceled by the combined actions of the comparator 15 and the discriminator 16.

Also, an upper limit register 17 is provided for setting a limit on the first slice level control unit 7. In general, the closed-caption signal is small in amplitude and its slice level does not need to be increased to an extremely high voltage. When the upper limit register 17 limits the upper values allowed in the first slice level control unit 7, the data slicing can be performed at a higher efficiency and in less time. The upper limit is preferably from about 2.5 to about 3.5 V.

The controller 14 is also coupled to a counter 18 which allows the apparatus to re-confirm that the closed caption signal has transitioned from present to absent, or from absent to present. This is accomplished by requiring more than one pass through the detector 11 to confirm that the desired transition has occurred. The counter 18 increases accuracy by detecting when the signal detector 11 misreads the presence of the closed-caption signal due to interference such as noise.

The circuit components illustrated in FIG. 1 are individually known IC components. For example, the controller 14 may be a conventional microprocessor, and the remaining components may be implemented using standard counters and registers.

With reference to both FIGS. 1 and 2, more detailed description of the program and method of data slicing illustrated in FIG. 2 will now be described. The method begins by setting the upper limit of the first slice level control unit 7 in the upper limit register 17. The upper limit is preferably set in the range from about 2.5 to about 3.5 volts. The first slice level control unit 7 in the slice level output device 5 is then selected and enabled by the controller 14 (not shown).

In the initialization block 30, the initial slice level stored in the initial value storage unit 10 is transferred to the first slice level control unit 7 for initialization of the slice level. The initial slice level is low enough to be out of the range of closed-caption signals.

The first routine, A, begins with decision block 31, in which the digitized closed-caption signal output from the slicer 3 is examined by looking for the start bits and performing a parity check in the signal detector 11. The signal detector looks for the start bit and performs parity check regardless of whether or not the closed caption signal is present.

When it is determined in decision block 31 that the closed-caption signal is not present, the program moves to block 32 where the voltage of the slice level is increased by 80 mV using the first slice level control unit 7. If the slice level, after being increased 80 mV by the first slice level control unit 7 in block 32, exceeds the upper limit determined by the upper limit register 17, the program moves from block 33 to the initialization block 30. When the increased slice level is below the upper limit, the program returns to decision block 31. When it is determined at block 31 that the closed-caption signal is present, the program goes to decision block 49. Decision block 49 requires that the presence of the closed-caption signal be confirmed two times before the program is allowed to continue to the next routine. The decision block shown at 49 is implemented using the counter 18 shown in FIG. 1.

The slice level search routine starts with selecting and enabling the second slice level control unit 8 in the slice level output device 5 with the controller 14 (not shown). The initial slice level is then transferred from the initial value storage unit 10 to the second slice level control unit 8 at block 34 for re-initialization of the slice level. As before, the initial slice level is set low enough to be out of the range of closed-caption signal. Simultaneously, the memory flag 12 is reset (as not illustrated).

In the second and third routines, B and C, the minimum and maximum values of the slice level appropriate for data slicing the closed-caption signal are determined. In decision block 35, the memory flag 12 is examined to determine whether the minimum slice level has been established or not. If the memory flag has not been set (which is always the case on the first pass through the second routine), the program moves to decision block 37 where the target signal is sliced at the slice level determined by the second slice level control unit 8 and examined through identifying start bits and performing parity check. The start bit and parity bit are examined regardless of whether or not a closed-caption signal is present.

When it is determined at decision block 37 that the closed-caption signal is present, the program moves to block 40 where the slice level is increased by 40 mV. If the resultant slice level after the increase at block 40 exceeds the upper limit, it is judged that the closed-caption signal is not present, and the decision block at 41 returns the back to the initialization step at block 30 for a re-start of the first routine, A.

When it is determined at decision block 41 that the increased slice level is below the upper limit, the program is returned to decision block 35, and the examination of the closed-caption signal is repeated at decision block 37. When the closed-caption signal shifts from being absent to being present, the start bit and parity bit are recognized in decision block 37. In block 38, the minimum slice level is loaded from the second slice level control 8 to the temporary memory 13 and stored therein as the minimum slice level. In block 39, the memory flag 12 is set to indicate that the minimum slice level has been determined. In block 40, the slice level is again increased by 40 mV using the slice level control unit 8. When it is determined in block 41 that the increased slice level does not exceed the upper limit, the program returns to decision block 35.

The memory flag 12 was set at block 39, and therefore the answer to the inquiry in decision block 35 is now yes, and the program moves to the third routine to look for the maximum slice level. When it is judged in decision block 36 that the closed-caption signal is present, the maximum slice level has not yet been reached, and thus the program moves to block 40 where the slice level is increased by another increment of 40 mV. When either the absence of the start bits or a fault of the parity check is found at decision block 36, it is determined that the closed-caption signal is not present.

The slice level is continuously increased by 40 mV increments in block 40 until the maximum slice level is reached. The maximum slice level occurs when the slice level is so high that no start bits or parity bits are detected by the slicer 3. When the absence of the closed-caption signal is confirmed twice in block 46 using the counter 18, the program moves to block 42 where the maximum value of the slice level is loaded from the second slice level control 8 to the temporary memory 13 and stored therein as the maximum slice level. The reconfirmation at block 46 reduces the chance that interference or other noise will be mistaken for a valid closed caption signal.

In decision block 44, the difference between the maximum and minimum slice levels stored in the temporary slice level memory 13 is calculated and compared with a predetermined limit (120 mV) using the comparator 15 (shown in FIG. 1). If the calculated difference is less than 120 mV, both the temporary slice level memory 13 (maximum and minimum values) and the memory flag 12 are reset (as not illustrated) and the program moves to block 40. More specifically, when the difference between the maximum and minimum values is less than 120 mV, then the detected maximum and minimum values are judged to be too small to fit the expected peak to peak magnitude of the closed-caption signal and thus, it is concluded that an error has occurred and the closed caption signal is reexamined starting at the second routine B. When the difference between the maximum and minimum slice levels is greater than 120 mV, the program advances to the fourth routine D which is block 43.

In block 43, an optimum level is calculated by the calculator 9 using the maximum and minimum slice levels stored in the temporary slice level memory 13. The preferred equation is $$\{(maximum-minimum)-40(mV)\}/3+minimum.$$

The term (maximum−minimum)−40(mV) is used because the maximum value has been increased by 40 mV from its original value while repeating the examination of the closed-caption signal as the closed-caption signal was shifted from present to absent.

The optimum level calculated by the calculator 9 is then sent to the slice level storage unit 6 for storage as the optimum slice level. Data slicing can now proceed at the optimum slice level supplied from the slice level storage unit 6.

Figure 4:
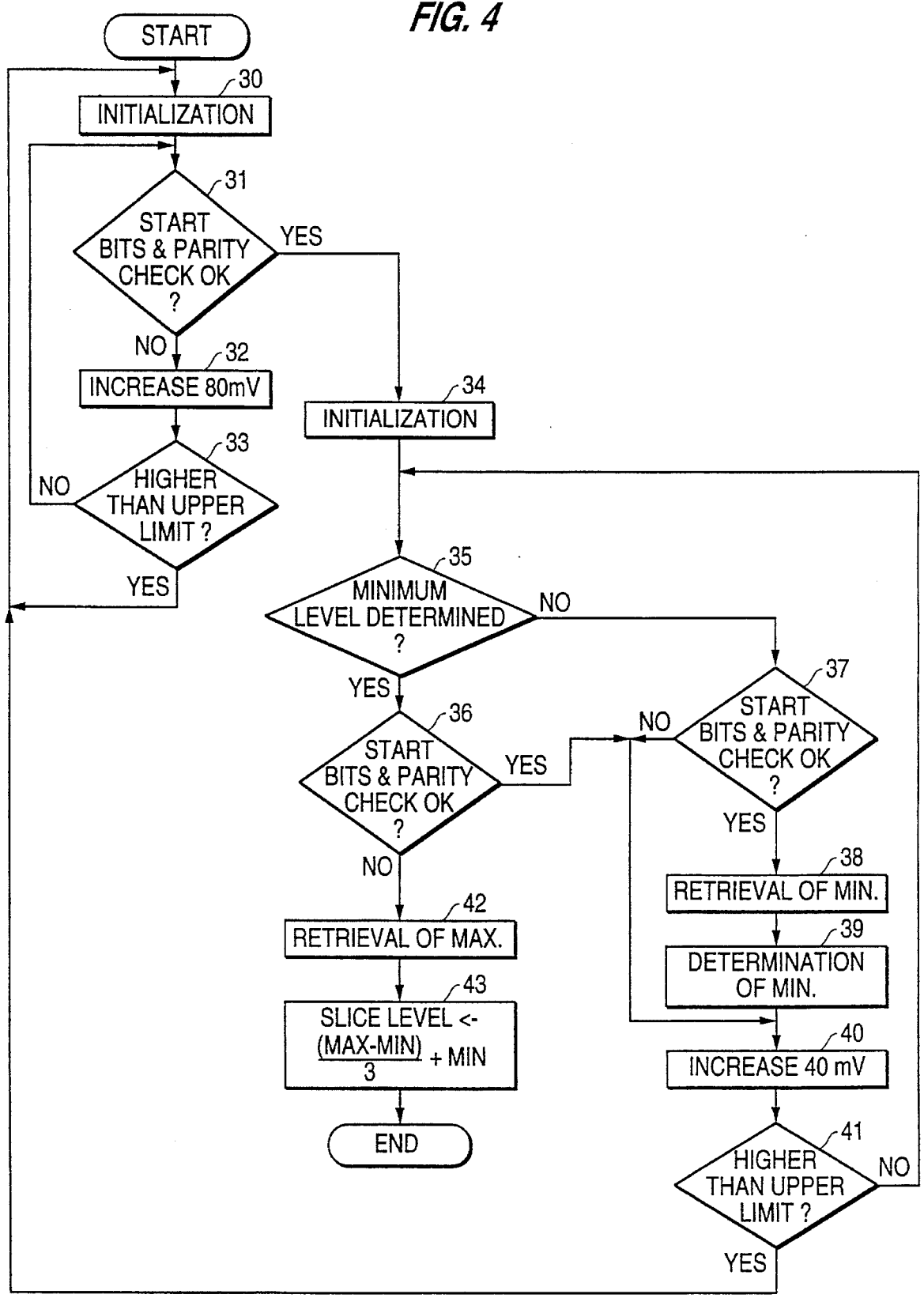
FIG. 4 is a flow chart of a second program embodying a data slicing method associated with the second embodiment of the present invention.
Figure 6:
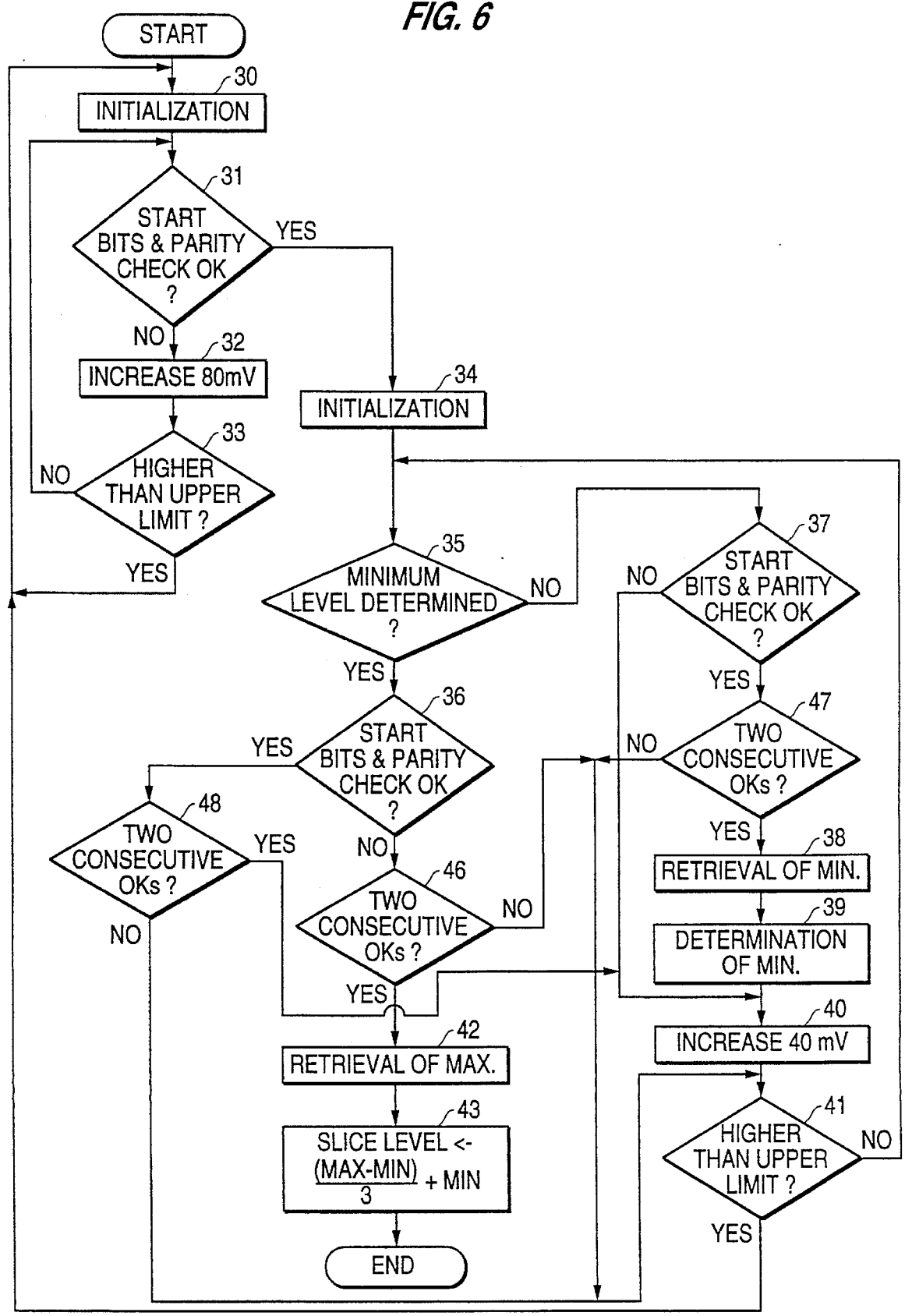
FIG. 6 is a flow chart of a third program embodying a data slicing method associated with the third embodiment of the present invention.

For simplicity, the voltage values referred to in FIGS. 2, 4 and 6 are analog values. In practice, however, the flow charts of FIGS. 2, 4 and 6 are implemented as a computer program that uses digital values. The preferred implementation of the present invention uses an approximation in order to calculate one-third of the difference between the maximum allowable slice level and the minimum allowable slice level. Consider the following example.

i) First, assume the following Comparison Table

| Digital Value | Analog Level |
| --- | --- |
| 1 | ≈40 mV |
| 2 | ≈80 MV |
| 3 | ≈120 mV |
| . | . |
| . | . |

-continued

| Digital Value | Analog Level |
| --- | --- |
| 128 | ≈5000 mV | ii) Second, assume that the detected minimum slice level is 50, and the detected maximum slice level is 59.

iii) In Decision Block 44, $$(Max - Min) =$$
$$59 - 50 = 9 \text{ and}$$
$$9 > 3 \text{ (i.e. 120 mV)}$$

iv) In Block 43, the slice level is calculated using an "approximation" of one-third of the difference between the maximum allowable slice level and the minimum allowable slice level.

$$\left(\frac{Max - Min}{2} - 1\right) + Min =$$

$$\left(\frac{59 - 50}{2} - 1\right) + 50 =$$

$$4.0 - 1 + 50 =$$

$$53$$

v) Note that (59−50)/2 is rounded from 4.5 to 4.0 because the digital computer cannot manipulate decimal numbers Although the above-described circuit and method are preferred, some of the components and/or steps illustrated in FIGS. 1 and 2 may be modified. More particularly, the comparator 15, discriminator 16, upper limit register 17, and counter 18 may be deleted, modified, or provided in combinations other than those shown in FIGS. 1 and 2.

In this regard, FIGS. 3, 4, 5, and 6 illustrate additional embodiments of a data slicing circuit and method in accordance with the present invention. The circuit illustrated in FIG. 3 uses substantially the same components as the circuit shown in FIG. 1, except the circuit of FIG. 3 eliminates the use of the comparator 15, the discriminator 16, the upper limit value register 17, and the counter 18. The remaining arrangement is identical to that of FIG. 1 and will be explained in no more detail.

Figure 3:
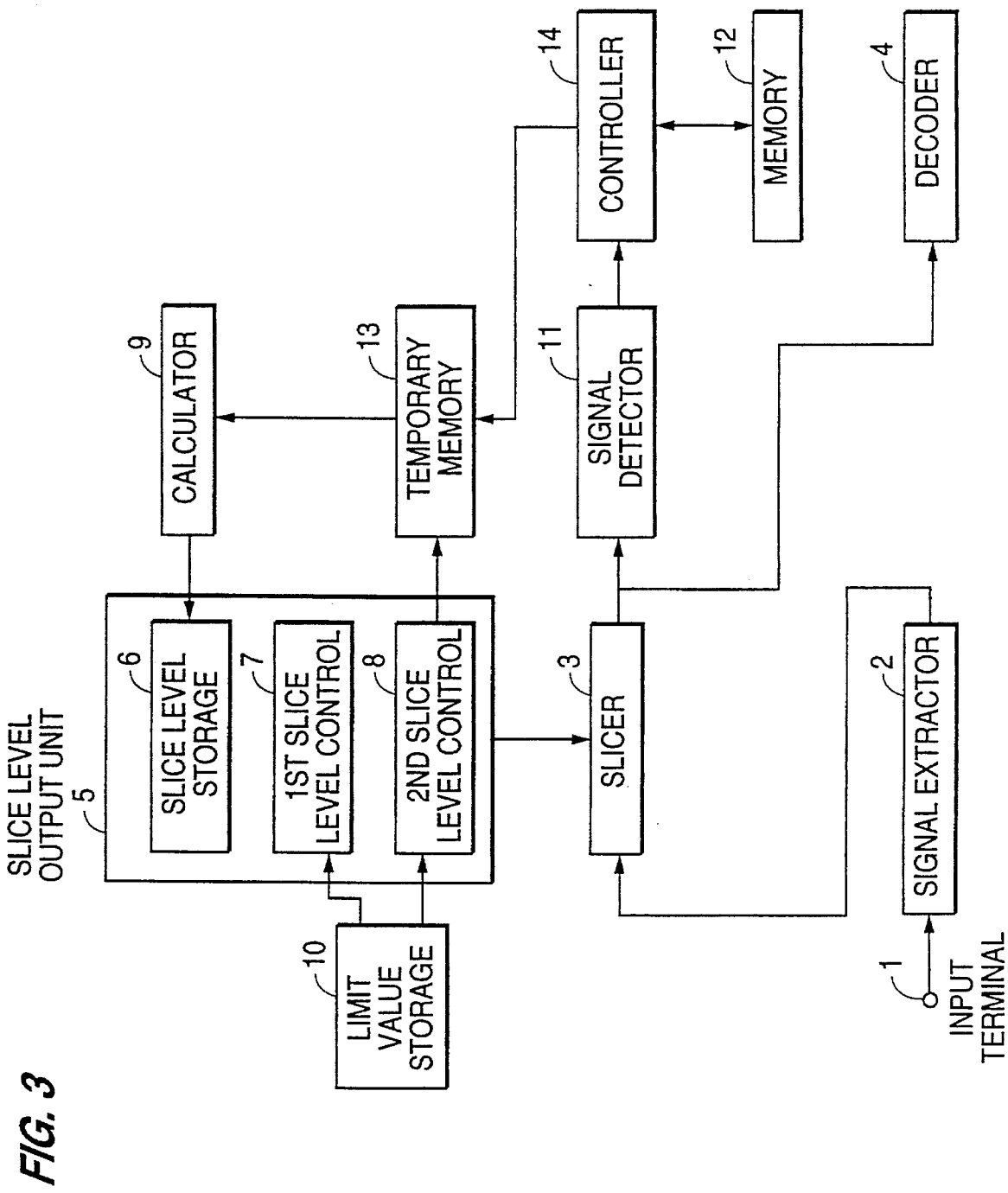
FIG. 3 is a block diagram of a data slicing apparatus showing a second embodiment of the present invention.

The operation of the data slicing circuit shown in FIG. 3 is implemented by the program shown in the flow chart of FIG. 4. The flow chart of FIG. 4 follows substantially the same steps as the flow chart of FIG. 2, except for a few modifications. Decision blocks 46 and 49 are not used in FIG. 4, and thus, the examination of the closed-caption signal is carried out only one time. Additionally, decision block 44 is not used in FIG. 4, and thus, difference between the maximum and minimum slice levels is not compared with a reference value. Because an upper limit register 17 is not provided in the circuit shown in FIG. 2, the upper limits at decision blocks 33 and 41 are only limited by the upper limit of the source voltage of the controller 14. The controller 14 is preferably a conventional microcomputer, and thus its source voltage is usually about 5 volts.

Figure 5:
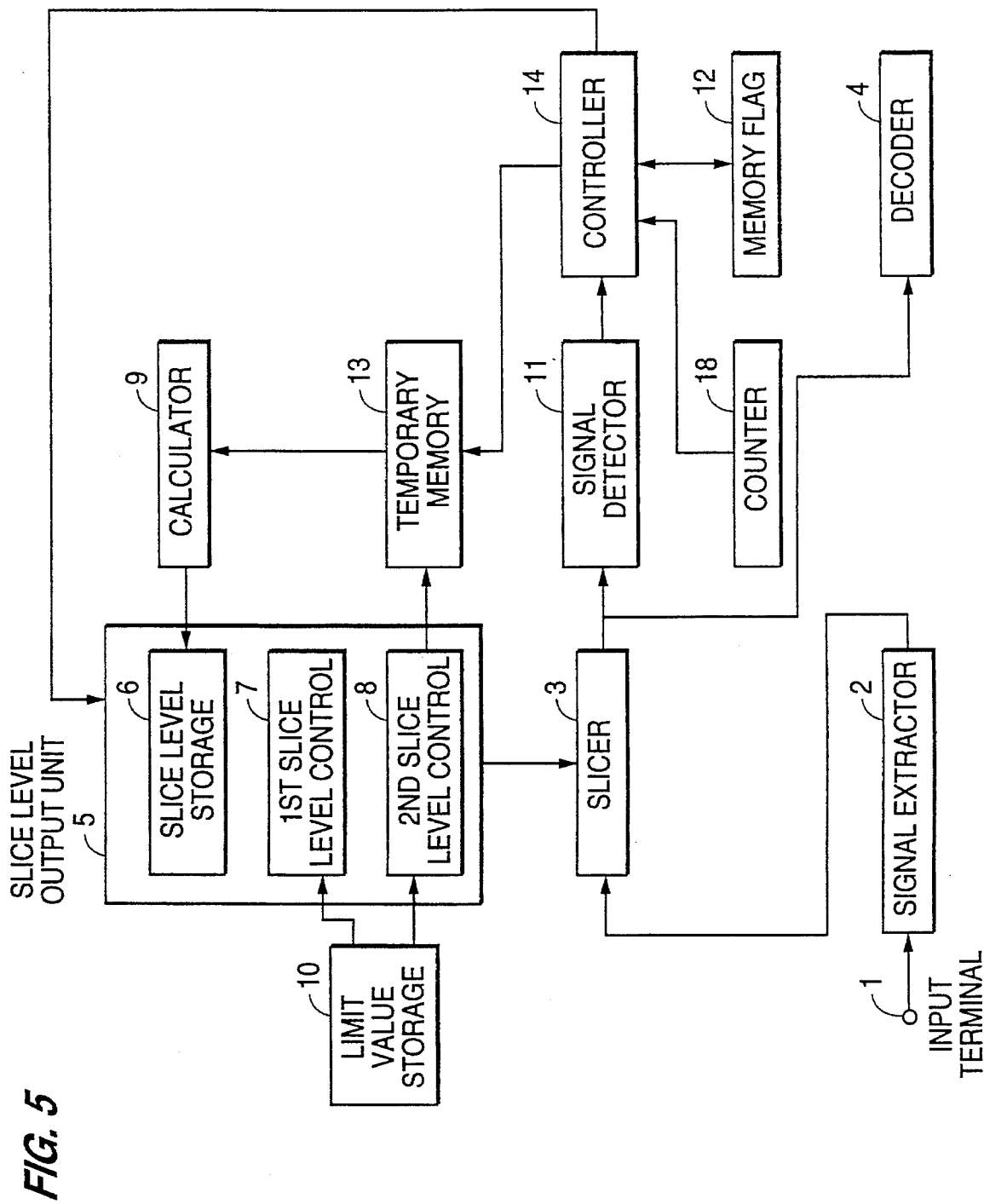
FIG. 5 is a block diagram of a data slicing apparatus showing a third embodiment of the present invention.

FIGS. 5 and 6 illustrate a third embodiment of the present invention. The third embodiment is substantially the same as the embodiment shown in FIGS. 1 and 2, except that the comparator 15, discriminator 16, and upper limit register 17 are eliminated. The counter 18 of this embodiment, shown in FIG. 5, has an operation that will be explained in more detail in connection with the flow chart of FIG. 6.

The program illustrated in FIG. 6 begins at block 30. Before initialization, however, the first slice level control unit 7 is selected and enabled by the controller 14 for examining whether the target TV signal carries a closed-caption signal or not. The initial slice level stored in the initial value storage 10 is then fed to the first slice level control unit 7.

In decision block 31, a digitized component of the TV signal from the slicer 3 is examined by the signal detector 11 by identifying start bits and performing parity check. This is done regardless of whether or not the closed-caption signal is present. When it is determined in decision block 31 that the closed-caption signal is not present, the program moves to block 32 where the slice level voltage is increased by 80 mV using the first slice level control unit 7.

In decision block 33, the increased slice level is compared to a control limit. If the increased slice level exceeds the control limit of the first slice level control unit 7, the program returns to initialization at block 30. If the increased slice level is lower than the control limit of the first slice level control unit 7, the program returns to decision block 31.

When it is determined at decision block 31 that the closed-caption signal is present, the program goes to a set of routines for finding the maximum and minimum slice levels for the closed caption signal. Just prior to the initialization block shown at 34, the second slice level control unit 8 in the slice level output unit 5 is selected and enabled by the controller 14. During the initialization performed in block 34, the initial slice level stored in the initial value storage 10 is fed to the second slice level control unit 8, and the memory flag 12 is reset to indicate that the minimum slice level has not yet been detected.

In decision block 35, the memory flag is examined to determine whether not the minimum slice level has been found. On the first pass through the decision block 35, the memory flag has just been reset, and thus, the program moves to decision block 37 where the start bit and parity check are performed. When it is judged at decision block 37 that the closed-caption signal is present, and when the presence of the closed-caption signal has been reconfirmed two times at decision block 47, the minimum slice level in the second slice level control unit 8 is considered to be acceptable as the minimum slice level because the closed-caption signal has been shifted from absent to present. Accordingly, the voltage in the second slice control unit 8 is stored as the minimum slice level into the temporary slice level memory 13 at block 38, and the acquisition of the minimum slice level is recorded by setting the memory flag 12 at block 39. In block 40, the slice level voltage is increased by 40 mV using the second slice level control unit 8.

When it is judged at decision block 47 that two consecutive confirmations of the start bit and parity check have not been established, the program moves to decision block 41, where the output of the slicer is compared with an upper limit. If the upper limit is not exceeded, decision block 41 returns the program to decision block 35, and the step of examining with the same slice level whether the closed-caption signal is present or not is repeated.

When it is judged at decision block 37 that the closed-caption signal is not present, the program moves to decision block 40. If the slice level of the second slice level control unit 8 increased at block 40 exceeds the upper limit, the program moves from decision block 41 to the initialization steps at block 30 for restart. When the increased slice level is not higher than the upper limit, the program returns to decision block 35.

The memory flag 12 was set at block 39, and therefore the answer to the inquiry in decision block 35 is now yes, and the program now begins to look for the maximum slice level. When it is judged in decision block 36 that the closed-caption signal is present, the maximum slice level has not yet been reached, and thus the program moves to block decision block 48. If the presence of the closed-caption signal is confirmed two times in decision block 48, the program moves to block 40. If there are not two confirmations from decision block 48, then the program moves to decision block 41.

When it is judged at decision block 36 that the closed-caption signal is not present, and when the absence of the closed-caption signal has been confirmed two times in decision block 46, the current slice level is considered to be acceptable as the maximum slice level because the closed-caption signal has shifted from present to absent. Accordingly, the voltage in the second slice control unit 8 is stored as the maximum slice level into the temporary slice level memory 13 in block 42. If the absence of the closed-caption signal is not confirmed two times at decision block 46, the program moves to decision block 41.

In block 43, the calculator 9 calculates an optimum slice level using the maximum and minimum slice levels stored in the temporary slice level memory 13. It should be noted that the MAX variable is decreased by 40 mV before the calculation performed in block 43. The resultant optimum level from the calculation is stored into the slice level storage unit 6 for use as the optimum slice level for data slicing of the closed-caption signal.

In the embodiment illustrated in FIGS. 5 and 6, the presence or absence of the closed-caption signal is confirmed two times using the same slice level. Also, the examination (performed at decision block 31) using the first slice level control unit 7 is carried out one time while the examination (performed at decision blocks 36 and 37) with the second slice level control unit 8 is executed two times.

By using to the counter 18 in the manner described above, two or more consecutive examinations can be implemented using either the same or two different slice levels as shown in FIGS. 6 and 2, respectively.

It is also possible that the examination using the first slice signal control unit 7 is conducted twice, while the examination using the second slice signal control unit 8 is also executed twice.

The counter 18 is not limited to the two consecutive examinations of the embodiments described herein, and would be equally effective using three or more confirmations. The more confirmations, the greater the accuracy in determining the optimum slice level. The use of two confirmations is preferred in order to minimize processing time.

Thus, it can be seen from the above detailed description that the present invention achieves several advantages. In particular, the circuit and method of the present invention obtains an optimum slice level of a data slicer that is effective, simple, and inexpensive to implement. Additionally, the present invention provides a circuit and method of data slicing that is capable of operating successfully in a low TV signal receiving area.

Several modifications may be made to the disclosed embodiments without departing from the scope of the present invention. For example, the first and second slice level control units 7 and 8 in the slice level output device 5 may be substituted with a single slice level control unit. The preferred increments are about 80 mV in the first slice level control unit 7 and 40 mV in the second slice level control unit 8. However, almost any increment could be chosen based on the desired sensitivity of the system. The incremental searching techniques described herein could be reversed by setting the initial slice values high and then decreasing these values incrementally until the maximum and minimum slice values are determined. The method of recognizing the closed caption signal may be accomplished by any other appropriate technique, for example closely checking for the start bits only. The start bit group is not limited to 001. A bit stream of 010 may be used as the start bits. Also, the parity check may be conducted with equal success by an even parity method rather than the odd parity method described in the disclosed embodiments.

Additionally, the data slicing of the present invention is not limited to closed-caption signals, but is also applicable to other component signals multiplexed with a composite TV signal.

It is therefore intended that the foregoing detailed description be regarded as illustrative rather than limiting, and that it be understood that it is the following claims, including all equivalents, which are intended to define the scope of the invention.

A suitable computer program for carrying out the functions illustrated in FIGS. 2, 4, and 6 and described herein is listed on the following pages. The program is written on CL/1 programming language.

```
/*     ********************************************     */
/*          Closed caption decoder software.            */
/*          This software is the slice level setting.   */
/*          Copyright by Matsushita Electronics Corporation  */
/*                                                      */
/*              1 Kotari Yakemachi                      */
/*              Nagaokakyo Kyoto 617 JAPAN              */
/*     ********************************************     */
#define  Dc_hslice    25;      /* The slice level controller initial value. */
/*********************************************************
TITLE:      capslice( )
TITDOC:     The slice level of closed caption signal setting.
REMARK:
            This procedure will be called from main routine.
The main routine will execute each vertical signal.
            It includes 3 steps to set the slice lvel.
(1) Using the first slice level controller.
The purpose is to check if the closed caption signal existing or not.
```

-continued (2) Using the second slice level controller.
The purpose is to fix the best position of the slice level.
(3) Using the storage of the slice level.
Store the fixed slice level to decord data.
*************************************************************/
```
capslice( )
{
    if (cap_slice <= cap_highs1 || Zc_old_start_bit == 1) {
/*  The slice level is within the maximum limitation or the start bit was
            detected and otherwise goto 'else'.      */
            cap_prt_ng = 0;                    /* The parity flag clear */
            capprt ( );                        /* Parity check */
            if (Zc_old_start_bit == 1) {   /* Is the previous start bit detected? */
/*  Yes, and judge if the caption data is correct or not. */
/*  The criterion of judgement is the start bit and the parity check. */
                if( cap_cpr0.2 != 1 || cap_prt_ng != 0) {
/*  The result is incorrect data.
If  it continuously happen, the slice level inclease 40 mV. */
                        if(Zc_serr == 0)      {    /* The previous data is NG? */
                            Zc_serr = 1;           /* Yes, it's the 1st time, */
                        }
                        else{
                            Zc_serr = 0;           /* No, it's the 2nd time. */
                            cap_slice --;          /* Slice level increase 40 mV. */
                        Zc_old_start_bit = 0;  /* The start bit 'OK' flag clear. */
                        cap_work0 = cap_slice - cap_low_slice;
                        if (cap_work0 > 2) {
/*  The difference of maximum and minimum data is more than 120 mV. */
/*  Approximate 1/3 of the difference. */
                            cap_work0 >>= 1;
                            if (cap_work0 > 3) {
                                cap_work0 -= 1;
                            }
                            cpr4 = cap_low_slice + cap_work0;
                                                 /* The slice level fix. */
                            Zc_slice = 0;        /* The slice level fix flag set. */
/*  Initialize for next    job as the closed caption decord.
    The slice level   setting is complete. */
                            cap_ok_cnt = 0;
                            cap_ng_cnt = 0;
                            cap_mode = 4;
                            cap_dis_mode = 0;
                            return;
                        }
                    }
                }
            }
            else{              /* The previous start bit is not detected. */
/*  Check if the caption data is correct or not.
    The criterion of judgement is the start bit or the parity check. */
                if( cap_cpr0.2 == 1 && cap_prt_ng == 0) {
                    if (cap_work4 == 1) {
                        if (Zc_serr == 0) {      /* The previous data is OK? */
                            Zc_serr = 1;         /* Yes, it's the 1st time, */
                        }
                        else{
                            Zc_serr = 0;         /* No, it's the 2nd time. */
                            cap_slice = Dc_hslice;
                            cpr4 = cap_slice;    /* The cpr4 is the D/A output. */
                            cap_work4 = 0;
                        }
                    }
                    else{
                        cap_low_slice = cap_slice;   /* Set minimum slice level. */
                        Zc_serr = 0;                 /* The flag got NG status clear. */
                        Zc_old_start_bit = 1;        /* The start bit 'OK' flag set. */
                    }
                }
                else{
                    Zc_serr = 0;   /* The flag for OK status clear. */
                }
            }
        }
        if(cap_work4 == 1) {                   /* Check 1st or 2nd slice level */
            cap_slice += 2;                    /* The slice level increase 80 mV. (1st) */
        }
        else{
            cap_slice ++;                      /* The slice level increase 40 mV. (2nd) */
        }
}
```

-continued

```
    else{
        cap_work4 = 1;              /* Re-start the data slice. */
        cap_slice = Dc_hslice;      /* Initialize the first slice controller. */
        cpr4 = cap_slice;           /* Data output (D/A) */
        Zc_old_start_bit = 0;       /* The start bit 'OK' flag reset */
        }
    }
/*    ************************************        */
/*            The parity check procedure.          */
/*    ************************************        */
capprt ( ) {
    cap_prt_ng <<= 2;               /* Save the parity flag. */
    cap_prt_ng &= 0x0c;
    cap_work0 = cap_buf[1];         /* Parity check. */
    cap_work2 = 0;                  /* Counter clear */
    repeat (8) {                    /* Repeat 8 times. */
        cap_work0 >>= 1;            /* Shift right 1 bit. */
        if (cf == 1) {              /* Check carry flag. */
            cap_work2 ++;           /* If CF is set, increment counter. */
        }
        if (cap_work2.0 == 0) {     /* If parity check is NG, */
            cap_prt_ng |= 1;        /* The 1st byte has parity error. */
            Zc_err = 1;             /* Error flag set. */
        }
    }
    cap_work0 = cap_buf[0];         /* Parity check. */
    cap_work2 = 0;                  /* Counter clear */
    repeat(8) {                     /* Repeat 8 times. */
        cap_work0 >>= 1;            /* Shift right 1 bit. */
        if (cf == 1) {              /* Check carry flag. */
            cap_work2 ++;           /* If CF is set, increment counter. */
        }
        if(cap_work2.0 == 0) {      /* If parity check is NG, */
            cap_prt_ng |= 2;        /* The 2nd byte has parity error. */
            Zc_err = 1;             /* Error flag set. */
        }
    }
    cap_buf [1] .7 = 0;             /* Eliminate parity bit. */
    cap_buf [0] .7 = 0;             /* Eliminate parity bit. */
}
/******* Description of RAM *******
[cap_slice]
    The closed caption data slice level. This data is transfered to 'cpr4' register.
[cap_highs1]
        Storage the upper limit for the slice level. Defined "Dc_hslice" is the
initial data for the slice level controller.
Example:   Initial value = 1.0 V (25 as a digital data)
           The upper limit value = 2.5 V (62 as a digital data)
[cap_prt_ng]
        The parity 'NG' flag.
Bit0 : Current parity check error for the 2nd byte of the closed caption data.
Bit1 : Current parity check error for the 1st byte of the closed caption data.
Bit2 : Previous parity check error for the 2nd byte of the closed caption data.
Bit3 : Previous parity check error for the 1st byte of the closed caption data.
[cap_work0]
[cap_work2]
        The working area.
[cap_work4]
        If this vaue is      "1" : Working the first slice level controller.
                             "0" : Working the second slice level controller.
[cap_low_slice]
        The minimum data for the slice level.
[cap_buf [1] ]
[cap_buf [0] ]
        Storage for the closed caption data. The "cap_buf [0]" as the second
byte of the closed caption data. The "cap_buf[1]" as the first byte.
[cap_cpr0.2]
        The start bit '001' flag. If the decoder detect the start bit, this
flag will be set to '1'.
[Zc_old_start_bit]
        This is the flag for the previous condition of the start bit.
[Zc_serr]
        This is the flag for the condition of the previous data of the closed caption.
        [cpr4]
        This is the special register with D/A function. It convert approximately
*/
```

We claim:

1. A data slicing circuit comprising:

a data slicer for receiving an analog first input, an analog second input, comparing said first input with said second input, and generating a digital output based on said comparison of said first input and said second input;

a slice level output device coupled to said data slicer and capable of outputing a slice level output to said data slicer's second input; and a calculator coupled to said slice level output device for calculating a desired slice level and providing said desired slice level to said slice level output device;

said calculator receiving a minimum slice level and a maximum slice level and calculating said desired slice level as being between said minimum slice level and said maximum slice level.

2. The circuit of claim 1 further comprising:

a controller coupled to said slice level output device and said calculator;

said controller being capable of instructing said calculator to calculate said desired slice level based on said maximum and said minimum slice levels and provide said desired slice level to said slice level output device;

said controller being further capable of instructing said slice level output device to output said desired slice level as said slice level output.

3. The circuit of claim 2 further comprising:

a signal detector coupled to said data slicer for receiving said digital output from said data slicer, said digital output containing a valid data indicator that provides an indication of whether said first analog input to said data slicer is valid;

said signal detector also coupled to said controller for providing said controller with an indication of whether said first analog input to said data slicer is valid;

a memory device coupled to said slice level output, said calculator, and said controller;

said controller being capable of instructing said memory to receive a minimum slice level from said slice level output device when said digital output makes a transition from not being present to being present;

said controller being further capable of instructing said memory to receive a maximum slice level from said slice level output device when said digital output makes a transition from being present to not being present;

said controller being capable of instructing said memory to transfer said minimum slice level and said maximum slice level to said calculator.

4. A data slicing circuit comprising:

a data slicer for receiving and slicing a component of a television signal and converting said component to digital;

a decoder for receiving and decoding an output of said data slicer;

an initial value storage for storing an initial slice value;

a slice level controller for varying said initial slice level by a predetermined amount;

a signal detector for detecting whether or not said digitized component from said slicer is a valid signal;

a temporary slice level memory for storing upper and lower levels of said valid signal detected by the signal detector;

a calculator for calculating an optimum value of a slice level from the upper and lower levels of the valid signal stored in the temporary slice level memory;

a slice level storage for storing the optimum slice level calculated by the calculator; and a controller for instructing said calculator to feed said optimum slice level to said data slicer.

5. The circuit of claim 4 wherein the signal detector detects said valid signal by detecting start bits and performing parity check.

6. The circuit of claim 4 further comprising:

a comparator for comparing with a reference value a difference between the upper and lower limits of the slice level stored in the temporary slice level memory; and a discriminator for disabling the output of the calculator when the difference between the upper and lower slice level limits is not greater than the reference value, said discriminator also enabling the output of said calculator when the difference between the upper and lower slice level limits is greater than the reference value.

7. The circuit of claim 4 further comprising an upper limit register coupled to said slice level output device for setting the upper limit of the slice level so that the slice level is returned by the slice level controller to the slice level's initial value when the slice level has exceeded the upper level.

8. The circuit of claim 4 further comprising a counter coupled to said controller for allowing the controller to detect a valid signal at least twice.

9. An apparatus for data slicing a television signal comprising:

an extractor for extracting a specific component from the television signal of analog form;

a slicer for slicing the specific component of the television signal and converting it to its digital form;

a decoder for decoding an output of the slicer for display;

an initial value storage for storing an initial value of a slice level;

a slice level controller for varying the initial slice level by a predetermined amount;

a signal detector for examining whether or not the digitized specific component from the slicer is a desired multiplex signal;

a temporary slice level memory for storing upper and lower levels of the desired multiplex signal detected by the signal detector;

a calculator for calculating an optimum value of the slice level from the upper and lower levels of the multiplex signal stored in the temporary slice level memory;

a slice level storage for storing the optimum slice level calculated by the calculator; and a controller for selectively feeding the slicer with the optimum slice level retrieved from either the slice level storage or the slice level controller according to a resultant judgment of the signal detector.

10. The apparatus of claim 9, wherein the signal detector examines through identifying start bits and performing parity check whether the desired multiplex signal is present or not.

11. The apparatus of claim 9 further comprising:

a comparator for comparing with a reference value a difference between the upper and lower limits of the slice level stored in the temporary slice level memory; and a discriminator for disabling the output of the calculator when the difference between the upper and lower slice level limits is not higher than the reference value and enabling it when the difference is higher than the reference value.

12. The apparatus of claim 9 further comprising an upper limit register for setting the upper limit of the slice level so that the slice level is returned by the slice level controller to its initial value when it has exceeded the upper level.

13. The apparatus of claim 9 further comprising a counter for allowing the controller to examine the presence of the desired multiplex signal more than one time with a same slice level.

14. The apparatus of claim 9 further comprising a counter for allowing the controller to examine the presence of the desired multiplex signal more than one time with different slice levels.

15. An apparatus for data slicing a television signal comprising:

an extractor for extracting a specific component from the television signal of analog form;

a slicer for slicing the specific component of the television signal and converting it to its digital form;

a decoder for decoding an output of the slicer for display;

an initial value storage for storing an initial value of a slice level;

a first slice level controller for varying the initial slice level by a predetermined rate;

a second slice level controller for varying the initial slice level by an amount smaller than the predetermined amount of the first slice level controller;

a signal detector for examining whether or not the digitized specific component from the slicer is a closed-caption signal;

a temporary slice level memory for storing the upper and lower levels of the closed-caption signal detected by the signal detector;

a calculator for calculating an optimum value of the slice level from upper and lower levels of the closed caption signal stored in the temporary slice level memory;

a slice level storage for storing the optimum slice level calculated by the calculator; and a controller for selectively feeding the slicer with the optimum slice level retrieved from either the slice level storage or the two slice level controllers according to a resultant judgment of the signal detector.

16. The apparatus of claim 15 wherein the signal detector examines through identifying start bits and performing parity check whether the closed-caption signal is present or not.

17. The apparatus of claim 15 further comprising:

a comparator for comparing with a reference value a difference between the upper and lower limits of the slice level stored in the temporary slice level memory; and a discriminator for disabling the output of the calculator when the difference between the upper and lower slice level limits is not higher than the reference value and enabling it when the difference is higher than the reference value.

18. The apparatus of claim 15 further comprising an upper limit register for setting the upper limit of the slice level so that the slice level is returned by the first slice level controller to its initial value when it has exceeded the upper level.

19. The apparatus of claim 15 further comprising a counter for allowing the controller to examine the presence of the closed-caption signal more than one time with the same slice level, thereby increasing the accuracy of the signal detector.

20. The apparatus of claim 15 further comprising a counter for allowing the controller to examine the presence of the closed-caption signal more than one time with different slice levels.

21. An apparatus for data slicing a television signal comprising:

an extractor for extracting a twenty-first or two hundred eighty-fourth clock component from the television signal of analog form;

a slicer for slicing the twenty-first or two hundred eighty-fourth clock component of the television signal and converting it to its digital form;

a decoder for decoding an output of the slicer for display;

an initial value storage for storing an initial value of a slice level;

a first slice level controller for increasing the initial slice level by a predetermined amount;

a second slice level controller for increasing the initial slice level by a smaller amount than that of the first slice level controller;

an upper limit register for returning the slice level to its initial value when the slice level has exceeded the upper limit due to the action of the first or second slice level controller;

a signal detector for examining through identifying start bits and performing a parity check of the digitized twenty-first or two hundred eighty-fourth clock component of the television signal whether a closed-caption signal is present or not;

a counter for allowing the signal detector to perform the signal examination two or more times with the same slice level so that a judgment output of the signal detector is increased in correctness;

a temporary slice level memory for storing upper and lower levels of the closed-caption signal detected by the signal detector;

a calculator for calculating an optimum value of the slice level from the upper and lower levels of the closed caption signal stored in the temporary slice level memory;

a slice level storage for storing the optimum slice level calculated by the calculator;

a comparator for comparing with a reference value a difference between the upper and lower limits of the slice level stored in the temporary slice level memory;

a discriminator for disabling the output of the calculator when the difference between the upper and lower slice level limits is not higher than the reference value and enabling it when the difference is higher than the reference value; and a controller for selectively feeding the slicer with the optimum slice level retrieved from either the slice level storage or the two slice level controllers according to a resultant judgment of the signal detector, said first slice level control being adapted for confirming the presence of the closed-caption signal and said second slice level controller for use in determining the optimum slice level.

22. The apparatus of claim 21 wherein the first slice level controller provides increments of 80 mV, and the second slice level controller provides increments of 40 mV.

23. The apparatus of claim 21 wherein the optimum slice level is ⅓ the difference between the upper and lower levels below the maximum level.

24. A method of data slicing a television signal comprising the steps of:
  (a) initializing a slice level having a value;
  (b) slicing at the slice level and digitizing a specific component of the television signal;
  (c) examining through identifying start bits and performing parity check whether or not the digitized component is a desired multiplex signal;
  (d-1) if it was determined at step (c) that the digitized component is not the desired multiplex signal, increase the value of the the slice level by a predetermined amount and return to step (b);
  (d-2) temporarily storing the slice level as a lower limit of the multiplexed signal if it was determined at (c) that the multiplex signal is present;
  (e) increasing again value of the slice level by the predetermined amount;
  (f) slicing at the slice level and digitizing the specific component of the television signal;
  (g) examining through identifying start bits and performing parity check whether or not the digitized component determined in step (f) is a desired multiplex signal;
  (h-1) if it was determined at step (g) that the digitized component is the desired multiplex signal, increase the value of the slice level by the predetermined amount and return to step (f);
  (h-2) temporarily storing the slice level as an upper limit of the multiplexed signal if it was determined at (g) that the multiplex signal is not present;
  (i) calculating an optimum slice level from the upper and lower limits stored at (d-2) and (h-2); and
  (j) slicing at the optimum slice level and digitizing a succeeding component multiplexed with the television signal prior to decoding.

25. A method of data slicing a television signal comprising the steps of:
  (a) initializing a slice level having a value;
  (b) slicing at the slice level and digitizing a specific component of the television signal;
  (c) examining through identifying start bits and performing parity check whether or not the digitized component is a closed-caption signal;
  (d-1) if it was determined at step (c) that the closed-caption signal is not present, increase the value of the slice level by a first predetermined amount and return to step (b);
  (d-2) initializing the slice level again if it was determined at (c) that the closed-caption signal is present;
  (e) slicing again at the slice level and digitizing the specific component of the television signal;
  (f) examining through identifying start bits and performing parity check whether or not the digitized component determined at step (e) is a closed-caption signal;
  (g-1) if it was determined at step (f) that the closed-caption signal is not present, increase the value of the slice level by a second predetermined amount smaller than the first predetermined amount and return to step (e);
  (g-2) temporarily storing the slice level as a lower limit of the closed-caption signal if it was determined at (f) that the closed-caption signal is present;
  (h) increasing again the value of the slice level by the second predetermined amount;
  (i) slicing again at the slice level and digitizing the specific component of the television signal;
  (j) examining again through identifying start bits and performing parity check whether or not the digitized component of step (i) is a closed-caption signal;
  (k-1) if it was determined at step (j) that the closed-caption signal is present, increase again the value of the slice level by the second predetermined amount and return to step (i);
  (k-2) temporarily storing the slice level as an upper limit of the closed-caption signal if it was determined at (j) that the closed-caption signal is not present;
  (l) calculating an optimum slice level from the upper and lower limits stored at (g-2) and (k-2); and
  (m) slicing at the optimum slice level and digitizing a succeeding component multiplexed with the television signal prior to decoding.

26. A method of data slicing a television signal comprising the steps of:
  (a) initializing a slice level having a value;
  (b) slicing at the slice level and digitizing a specific component of the television signal;
  (c) examining through identifying start bits and performing parity check whether or not the digitized component is a closed-caption signal;
  (d) slicing at the same slice level as set forth in step (b) and again digitizing the specific component of the television signal;
  (e) examining again through identifying start bits and performing parity check whether or not the digitized component is a closed-caption signal;
  (f-1) if it was determined either steps (c) or (e) that the closed-caption signal is not present, increase the value of the slice level by a first predetermined amount and return to step (b);
  (f-1') returning to step (b) if it was not determined at both steps (c) and (e) that the closed-caption signal is present;
  (f-2) initializing the slice level again if it was determined at both (c) and (e) that the closed-caption signal is present;
  (g) slicing again at the slice level and digitizing the specific component of the television signal;
  (h) examining again through identifying start bits and performing parity check whether or not the digitized component is a closed-caption signal;
  (i) slicing at the same slice level set forth in step (g) and digitizing the specific component of the television signal;
  (j) examining through identifying start bits and performing parity check whether or not the digitized component determined at step (i) is a closed-caption signal;
  (k-1) if it was determined at either (h) or (j) that the closed-caption signal is not present, increase the value of the slice level by a second predetermined amount smaller than the first predetermined amount and return to step (g);
  (k-2) temporarily storing the slice level as a lower limit of the closed-caption signal if it was determined at both (h) and (j) that the closed-caption signal is present;
  (l) increasing the value of the slice level by the second predetermined amount;
  (m) slicing again at the slice level and digitizing the specific component of the television signal;

(n) examining again through identifying start bits and performing parity check whether or not the digitized component is a closed-caption signal;

(o-1) if it was determined at step (n) that the closed-caption signal is present, increase the value of the slice level by the second predetermined amount and return to step (m);

(o-2) temporarily storing the slice level as an upper limit of the closed-caption signal if it was determined at (n) that the closed-caption signal is not present;

(p) calculating an optimum slice level from the upper and lower limits stored at (k-2) and (o-2); and (q) slicing at the optimum slice level and digitizing a succeeding component multiplexed with the television signal prior to decoding.

27. A method of data slicing a television signal comprising the steps of:

(a) initializing a slice level having a value;

(b) slicing at the slice level and digitizing a specific component of the television signal;

(c) examining through identifying start bits and performing parity check whether or not the digitized component is a closed-caption signal;

(d) slicing at a different slice level from that of (b) and digitizing the specific component of the television signal;

(e) examining again through identifying start bits and performing parity check whether or not the digitized component is a closed-caption signal;

(f-1) if it was determined at either (c) or (e) that the closed-caption signal is not present, increase the value of the slice level by a first predetermined amount and return to step (b);

(f-2) initializing the slice level again if it was determined at both (c) and (e) that the closed-caption signal is present;

(g) slicing again at the slice level and digitizing the specific component of the television signal;

(h) examining again through identifying start bits and performing parity check whether or not the digitized component is a closed-caption signal;

(i) slicing at a different slice level from that of (g) and digitizing the specific component of the television signal;

(j) examining again through identifying start bits and performing parity check whether or not the digitized component of (i) is a closed-caption signal;

(k-1) if it was determined at either (h) or (j) that the closed-caption signal is not present, increase the value of the slice level by a second predetermined amount smaller than the first predetermined amount and return to step (g);

(k-2) temporarily storing the slice level as a lower limit of the closed-caption signal if it was determined at both (h) and (j) that the closed-caption signal is present;

(l) increasing the value of the slice level by the second predetermined amount;

(m) slicing again at the slice level and digitizing the specific component of the television signal;

(n) examining again through identifying start bits and performing parity check whether or not the digitized component is a closed-caption signal;

(o-1) if it was determined at (n) that the closed-caption signal is present, increase the value of the slice level by the second predetermined amount and return to step (m);

(o-2) temporarily storing the slice level as an upper limit of the closed-caption signal if it was determined at (n) that the closed-caption signal is not present;

(p) calculating an optimum slice level from the upper and lower limits stored at (k-2) and (o-2); and (q) slicing at the optimum slice level and digitizing a succeeding component multiplexed with the television signal prior to decoding.

* * * * *